US010294848B2

(12) United States Patent
Issler

(10) Patent No.: US 10,294,848 B2
(45) Date of Patent: May 21, 2019

(54) CONNECTING ROD AND ASSEMBLY COMPRISING A PISTON AND A CONNECTING ROD

(71) Applicant: Mahle International GmbH, Stuttgart (DE)

(72) Inventor: Wolfgang Issler, Schwaikheim (DE)

(73) Assignee: Mahle International GmbH (DE)

( * ) Notice: Subject to any disclaimer, the term of this patent is extended or adjusted under 35 U.S.C. 154(b) by 180 days.

(21) Appl. No.: 15/327,029

(22) PCT Filed: Jul. 17, 2015

(86) PCT No.: PCT/EP2015/066381
§ 371 (c)(1),
(2) Date: Jan. 17, 2017

(87) PCT Pub. No.: WO2016/009033
PCT Pub. Date: Jan. 21, 2016

(65) Prior Publication Data
US 2017/0198625 A1 Jul. 13, 2017

(30) Foreign Application Priority Data

Jul. 18, 2014 (DE) .................. 10 2014 010 528

(51) Int. Cl.
*F01P 3/08* (2006.01)
*F16C 9/04* (2006.01)
(Continued)

(52) U.S. Cl.
CPC ...... *F01P 3/08* (2013.01); *F16C 7/00* (2013.01); *F16C 7/023* (2013.01); *F16C 9/04* (2013.01);
(Continued)

(58) Field of Classification Search
CPC ...... F01P 3/08; F16C 7/023; F16C 7/00; F16C 9/04; F16J 1/16; F16J 1/14; F16J 7/00; F16J 1/09
See application file for complete search history.

(56) References Cited

U.S. PATENT DOCUMENTS

| 4,129,108 A | 12/1978 | Elsbett et al. | |
| 6,209,510 B1 * | 4/2001 | Brogdon | F02B 75/246 |
| | | | 123/197.2 |

(Continued)

FOREIGN PATENT DOCUMENTS

| CN | 2425231 Y | 3/2001 |
| CN | 201330792 Y | 10/2009 |

(Continued)

OTHER PUBLICATIONS

English abstract for CN-203412663.

(Continued)

*Primary Examiner* — Jacob M Amick
(74) *Attorney, Agent, or Firm* — Fishman Stewart PLLC

(57) ABSTRACT

A connecting rod for an internal combustion engine may include a connecting rod shank, a large connecting rod eye, and a small connecting rod eye with a pin bore. An end face of the small connecting rod eye may also include at least one overhang, the overhang running parallel to a central axis of the pin bore over its entire width transverse to the central axis of the pin bore. An edge of the overhang may also run parallel to the central axis of the pin bore.

16 Claims, 5 Drawing Sheets

(51) Int. Cl.
*F16C 7/00* (2006.01)
*F16J 7/00* (2006.01)
*F16C 7/02* (2006.01)
*F16J 1/16* (2006.01)
*F16J 1/09* (2006.01)

(52) U.S. Cl.
CPC . *F16J 1/09* (2013.01); *F16J 1/16* (2013.01); *F16J 7/00* (2013.01)

(56) References Cited

U.S. PATENT DOCUMENTS

| | | | |
|---|---|---|---|
| 2015/0247475 A1 | 9/2015 | Bischofberger et al. | |
| 2016/0208734 A1 | 7/2016 | Scharp | |

FOREIGN PATENT DOCUMENTS

| | | | |
|---|---|---|---|
| CN | 203412663 U | 1/2014 | |
| DE | 742696 C | 12/1943 | |
| DE | 1119601 B | 12/1961 | |
| DE | 2543478 A1 | 4/1977 | |
| DE | 3543109 C1 | 6/1987 | |
| DE | 102012017217 A1 | 5/2014 | |
| DE | 102013013962 A1 | 2/2015 | |
| DE | 10 2014 005 364 A1 | 10/2015 | |
| FR | 1246795 A | 10/1960 | |
| GB | 122602 A | 1/1919 | |
| GB | 2261717 A | 5/1993 | |
| JP | H05-86973 A | 4/1993 | |
| JP | H06-18620 | 3/1994 | |
| JP | 2013-181447 A | 9/2013 | |

OTHER PUBLICATIONS

English abstract for DE-3543109.
German Search Report for DE-102014010528.8, dated Mar. 24, 2015.
English abstract for JPH05-86973.
English abstract for DE-10 2014 005 364.
Office Action dated Aug. 29, 2018 for copending Chinese App. No. 201580038055.4.
English Abstract for JP2013-181447.
English Abstract for CN2425231.
English Abstract for CN201330792.

\* cited by examiner

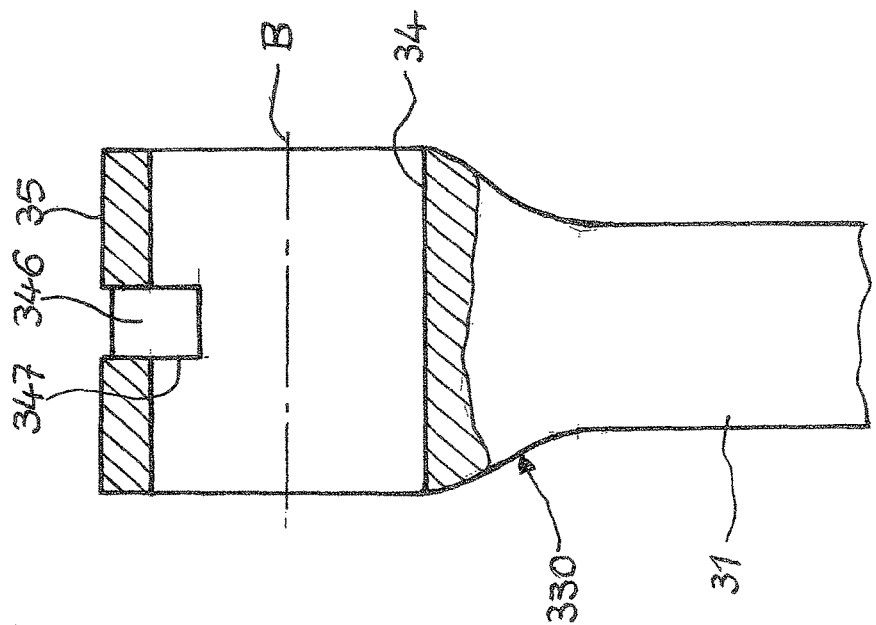
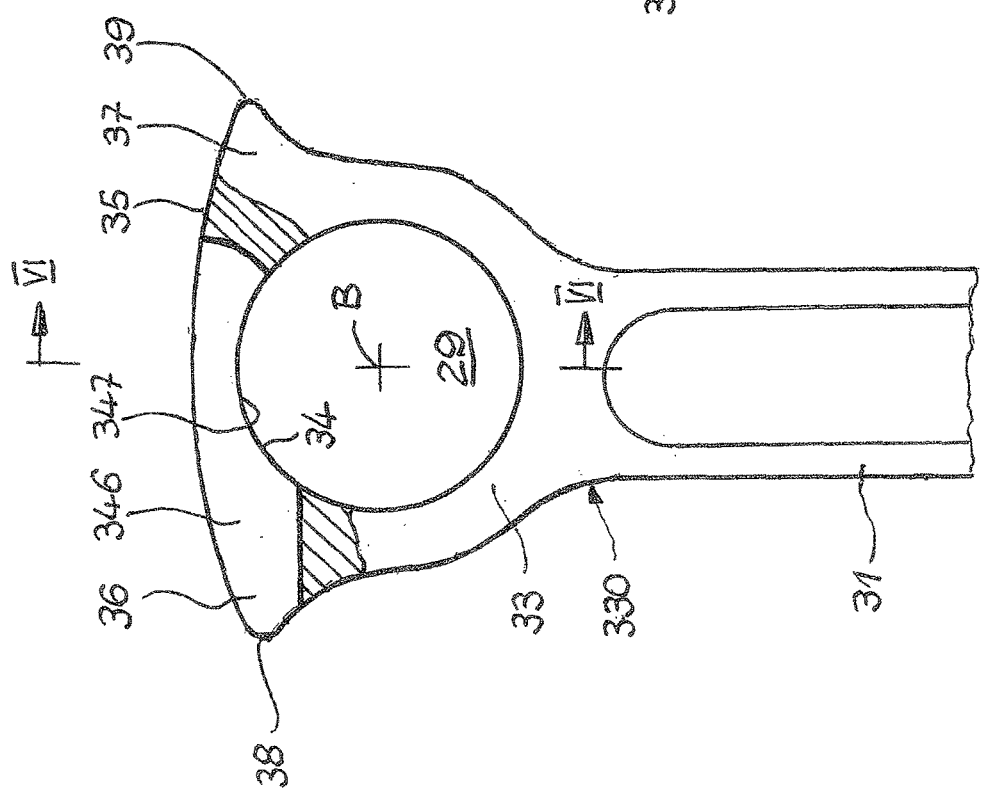

CONNECTING ROD AND ASSEMBLY COMPRISING A PISTON AND A CONNECTING ROD

CROSS-REFERENCE TO RELATED APPLICATIONS

This application claims priority to International Patent Application No. PCT/EP2015/066381, filed on Jul. 17, 2015, and German Patent Application No. 10 2014 010 528.8, filed on Jul. 18, 2014, both of which are hereby incorporated by reference in their entirety.

TECHNICAL FIELD

The present invention relates to a connecting rod for an internal combustion engine, having a connecting rod shank, a large connecting rod eye and a small connecting rod eye with a pin bore. The present invention further relates to an assembly comprising a piston and a connecting rod for an internal combustion chamber which is assigned an injection nozzle, wherein the piston has a piston shaft with hub bores, wherein the connecting rod has a connecting rod shank, a large connecting rod eye and a small connecting rod eye with a pin bore, wherein the small connecting rod eye is mounted by means of a piston pin accommodated in the hub bores and the pin bore in the piston interior.

BACKGROUND

Cooling of pistons under high loads, in particular of pistons composed of an aluminum material, with cooling oil is generally carried out by spraying onto the underside of the piston crown by means of an injection nozzle. This measure is vital for restricting the piston temperature in the region of the piston head during engine operation and thus for the lifespan of the piston. Since only one injection nozzle is generally provided for each piston, in order to achieve as uniform as possible a cooling action, it must be ensured that the cooling oil is guided as fully as possible between the end side of the small connecting rod eye and the underside of the piston crown to the side of the connecting rod facing away from the injection nozzle.

It is known from German patent applications 10 2013 013 962.7 and 10 2014 005 364.4 to provide baffle faces or deflection faces on the underside of the piston crown, which faces steer the cooling oil emitted by the injection nozzle into the region between the end side of the small connecting rod eye and the underside of the piston crown. This has the result that the production of such pistons becomes more difficult in order to adapt the complex structure of the piston interior to this requirement.

SUMMARY

The object of the present invention lies in further developing a generic assembly comprising a piston and a connecting rod so that the cooling oil is steered reliably into the region between the end side of the small connecting rod eye and the underside of the piston head so that the piston is effectively cooled in the region of the piston head.

The solution lies in the fact that the end face of the small connecting rod eye has at least one overhang running parallel to the central axis of the pin bore over its entire width transverse to the central axis of the pin bore, on which overhang an edge running parallel to the central axis of the pin bore is formed.

The subject matter of the present patent application is furthermore an assembly comprising a piston and a connecting rod, in the case of which the end face of the small connecting rod eye has an overhang running parallel to the central axis of the pin bore over its entire width transverse to the central axis of the pin bore at least on its side facing the injection nozzle, on which overhang an edge running parallel to the central axis of the pin bore is formed.

The concept according to the invention thus lies in, instead of the piston crown, configuring the form of the connecting rod so that in the assembly according to the invention the cooling oil is steered into the region between the face side of the small connecting rod eye and the underside of the piston crown. Modification of the connecting rod is technically significantly simpler to realize than the modification of the underside of the piston base, particularly in the case of forged pistons.

Advantageous further developments will become apparent from the subordinate claims.

Two opposite overhangs running parallel to the central axis of the pin bore are preferably provided on which edges running parallel to the central axis of the pin bore are formed. As a result of this measure, the end side of the connecting rod is widened on both sides of the central axis of the pin bore so that the cooling oil in the assembly according to the invention is held for a particularly long time in the region between the end side of the small connecting rod eye and the underside of the piston crown and the cooling action is thus amplified.

One preferred further development lies in the small connecting rod eye having at least one concave curvature running directly below an edge parallel to the pin bore over its entire width in order to collect cooling oil and steer it particularly reliably into the region between the end side of the small connecting rod eye and the underside of the piston crown.

In the assembly according to the invention, the concave curvature is expediently arranged on that side of the small connecting rod eye which is assigned an injection nozzle. In order to optimize weight distribution, it is advantageous that the small connecting rod eye has two concave curvatures running on both sides directly below the edges parallel to the pin bore over its entire width.

The end face of the small connecting rod eye can have a bore for the supply of cooling oil to the pin bore and/or a tub-shaped recess for temporary storage of cooling oil in the region between the end side of the small connecting rod eye and the underside of the piston crown. The bore is preferably formed within the recess in order to supply the pin bore with a quantity of cooling oil which is sufficient for lubrication.

A further preferred further development lies in a recess running transverse to the central axis of the pin bore, arranged symmetrically or asymmetrically to the central axis being provided at the end face of the small connecting rod eye, which recess also serves the purpose of temporarily storing cooling oil. If the recess has an opening for the supply of cooling oil to the pin bore, additional lubrication can be carried out at the piston pin.

If the piston has a piston crown with a contoured underside, it is particularly expedient that the contour of the end face of the small connecting rod eye is adapted to the contour of the underside of the piston crown in order to ensure unhindered cooling oil flow in the region between the end side of the small connecting rod eye and the underside of the piston crown.

A further advantageous configuration of the present invention lies in the distance between the underside of the piston crown and the end face of the small connecting rod eye on that edge which faces away from the injection nozzle being smaller than on the edge which faces the injection nozzle. As a result, the outflow of the cooling oil out of the region between the end face of the small connecting rod eye and the underside of the piston base is slowed down so that the cooling action in this region is further improved.

Exemplary embodiments of the present invention are explained in greater detail below on the basis of the enclosed drawings.

BRIEF DESCRIPTION OF THE DRAWINGS

In the drawings, in a schematic representation which is not true to scale:

FIG. 5 shows a further exemplary embodiment of a connecting rod according to the invention in a front view partially in section;

FIG. 6 shows a partial section along line VI-VI in FIG. 5.

DETAILED DESCRIPTION

Figure 1:
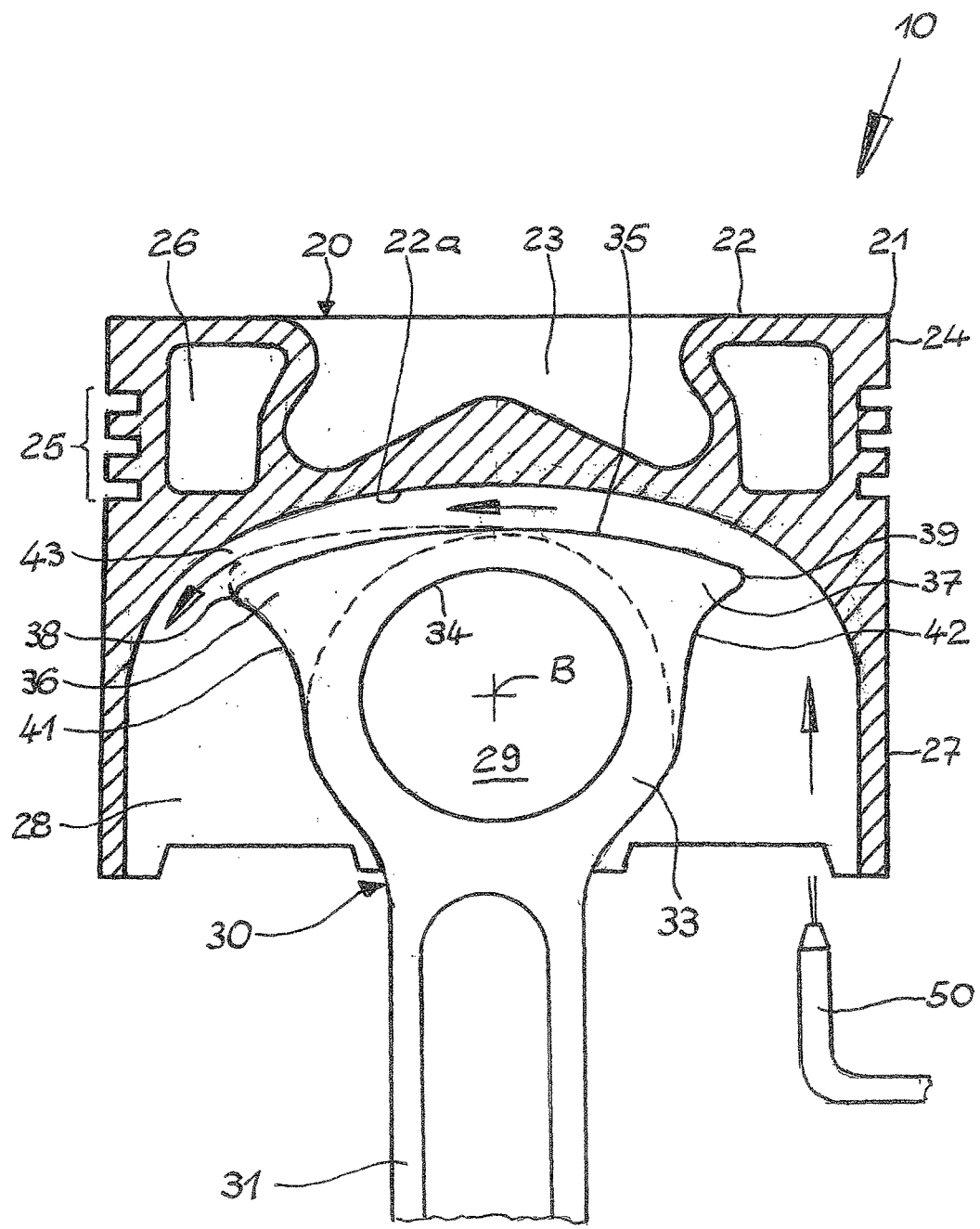
FIG. 1 shows a first exemplary embodiment of an assembly according to the invention comprising a piston and a connecting rod in section.
Figure 4:
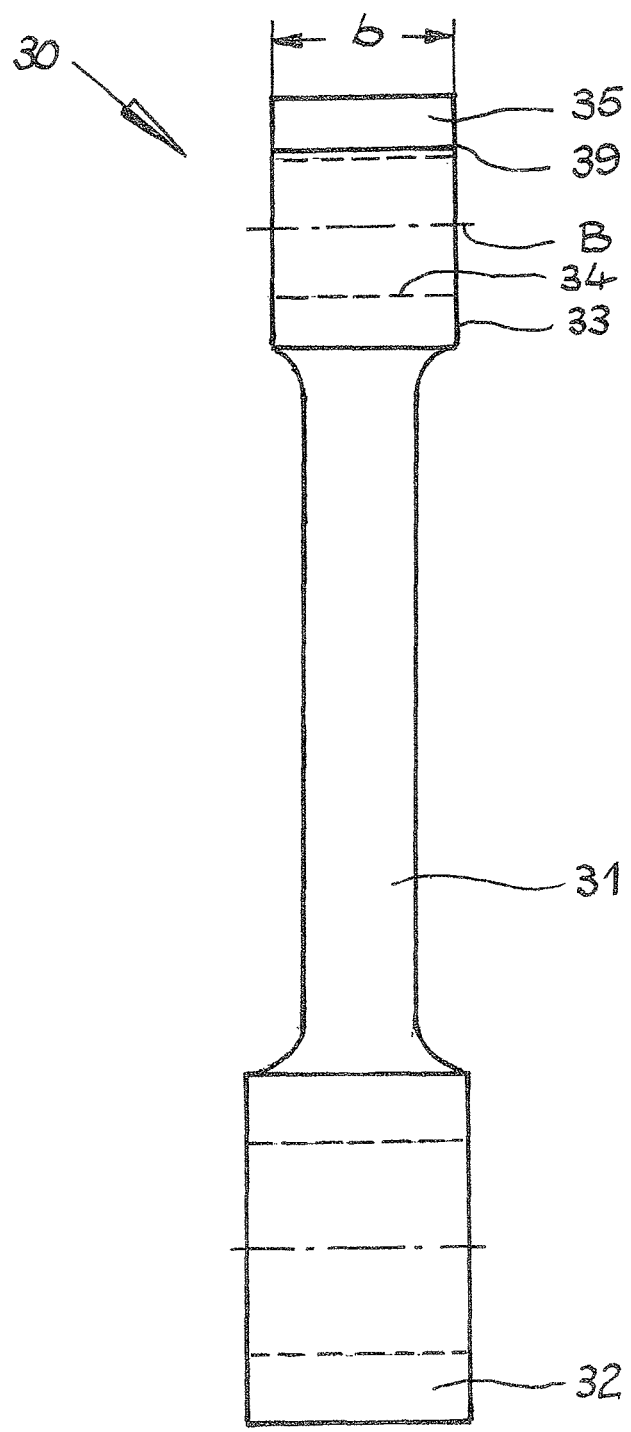
FIG. 4 shows the connecting rod according to FIG. 1 in a side view.

FIGS. 1 and 4 show a first exemplary embodiment of an assembly 10 according to the invention comprising a piston 20 with injection cooling and a connecting rod 30 (FIG. 1) or a first exemplary embodiment of a connecting rod 30 according to the invention (FIG. 4).

Piston 20 is represented by way of example as a one-part piston. Piston 20 has a piston head 21 with a piston crown 22 having a combustion cavity 23 and an underside 22a, a circumferential fire land 24 and a circumferential annular part 25 with annular grooves for accommodation of piston rings (not represented). A circumferential cooling duct 26 is provided at the height of annular part 25 in the exemplary embodiment. Cooling duct 26 does not, however, necessarily have to be provided in the case of a piston with injection cooling. Piston 20 furthermore has in a manner known per se a piston shaft 27 with piston hubs having hub bores (not represented).

Connecting rod 30 has, in a manner known per se, a connecting rod shank 31, a large connecting rod eye 32 (cf. FIG. 4) and a small connecting rod eye 33 with a pin bore 34. Small connecting rod eye 33 is mounted in assembly 10 in a manner known per se in piston interior 28 in that a piston pin 29 is guided through the hub bores of piston 20 and pin bore 34 of small connecting rod eye 33.

End face 35 of small connecting rod eye 33 has, in the exemplary embodiment, two overhangs 36, 37. For the purpose of illustration, the end face of a small connecting rod eye according to the prior art is indicated by a dashed line in FIG. 1. Overhangs 36, 37 are arranged opposite one another transverse to central axis B of pin bore 34 and run according to the invention over entire width b of small connecting rod eye 33 parallel to central axis B. Overhangs 36, 37 are formed in cross section so that their free ends form rounded edges 38, 39 in the exemplary embodiment which also run over entire width b of small connecting rod eye 33 parallel to central axis B (FIG. 4). Concave curvatures 41, 42 are formed directly below edges 38, 39, which curvatures 41, 42 also run over entire width b of small connecting rod eye 33 parallel to central axis B.

Overhang 37 or edge 39 or curvature 42 is assigned, in the internal combustion engine, an injection nozzle 50 for cooling oil, where the cooling oil flow is indicated by arrows.

End face 35 of the small connecting rod eye with overhangs 36, 37 preferably has a contour which is adapted to the contour of underside 22a of piston crown 22. The distance between end face 35 and underside 22a is selected so that the freedom of movement of connecting rod 30 in piston interior 28 is ensured. It is indicated by a dashed line in FIG. 1 that the distance between end face 35 and underside 22a in the region of overhang 36 facing away from injection nozzle 50 is smaller than in the region of overhang 37 facing injection nozzle 50. As a result, a bottleneck 43 is formed which slows down the outflow of the cooling oil so that the cooling action in this region is amplified. During engine operation, concave curvature 42 brings about that the fanned-out jet of cooling oil exiting from the injection nozzle is captured in this region, accelerated and steered around edge 39 of overhang 37 into the region between end face 35 of small connecting rod eye 33 and underside 22a of piston crown 22.

Figure 2:
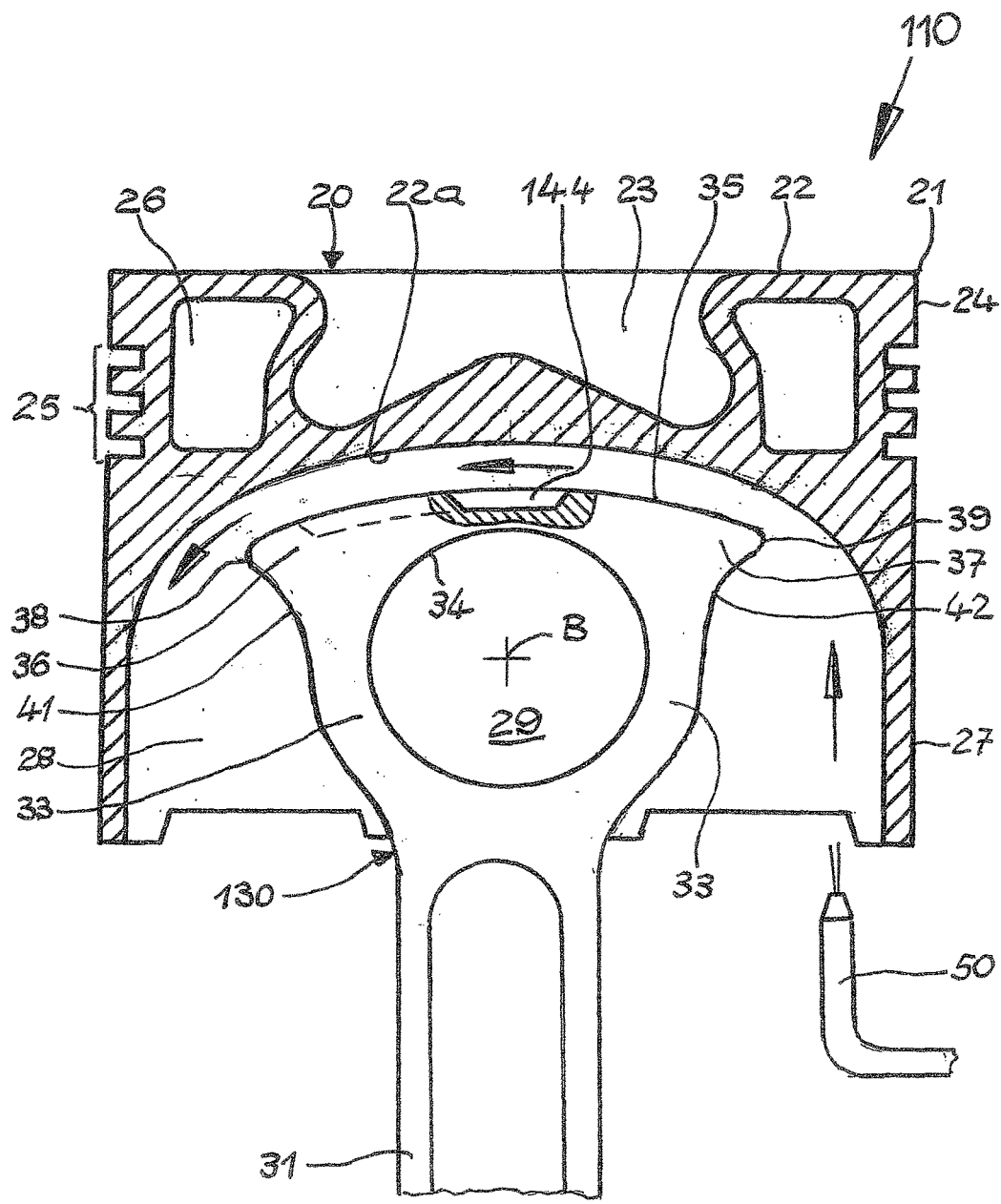
FIG. 2 shows a further exemplary embodiment of an assembly according to the invention comprising a piston and a connecting rod according to the invention in section.

FIG. 2 shows a further exemplary embodiment of an assembly 110 according to the invention, wherein with the exemplary embodiment according to FIG. 1 identical structures are provided with the same reference numbers and in this regard reference is made to the description of FIG. 1. The key difference from the exemplary embodiment according to FIG. 1 lies in the fact that connecting rod 130 has on its end side 35 a tub-shaped recess 144 which serves to collect cooling oil which is as a result prevented from flowing out over a certain period of time so that the cooling action in this region is amplified. Said recess 144 can also, as is represented by a dashed line in FIG. 2, be formed asymmetrically to central axis B of pin bore 34. In this case, recess 144 is expediently oriented towards that side of small connecting rod eye 34 which is arranged facing away from injection nozzle 50. As a result of this, it is achieved that the pivoting movement of connecting rod 31 which executes said movement during engine operation about central axis B of pin bore 34 supports the transport of cooling oil in the direction of overhang 38, i.e. towards the side of small connecting rod eye 33 facing away from injection nozzle 50.

Figure 3:
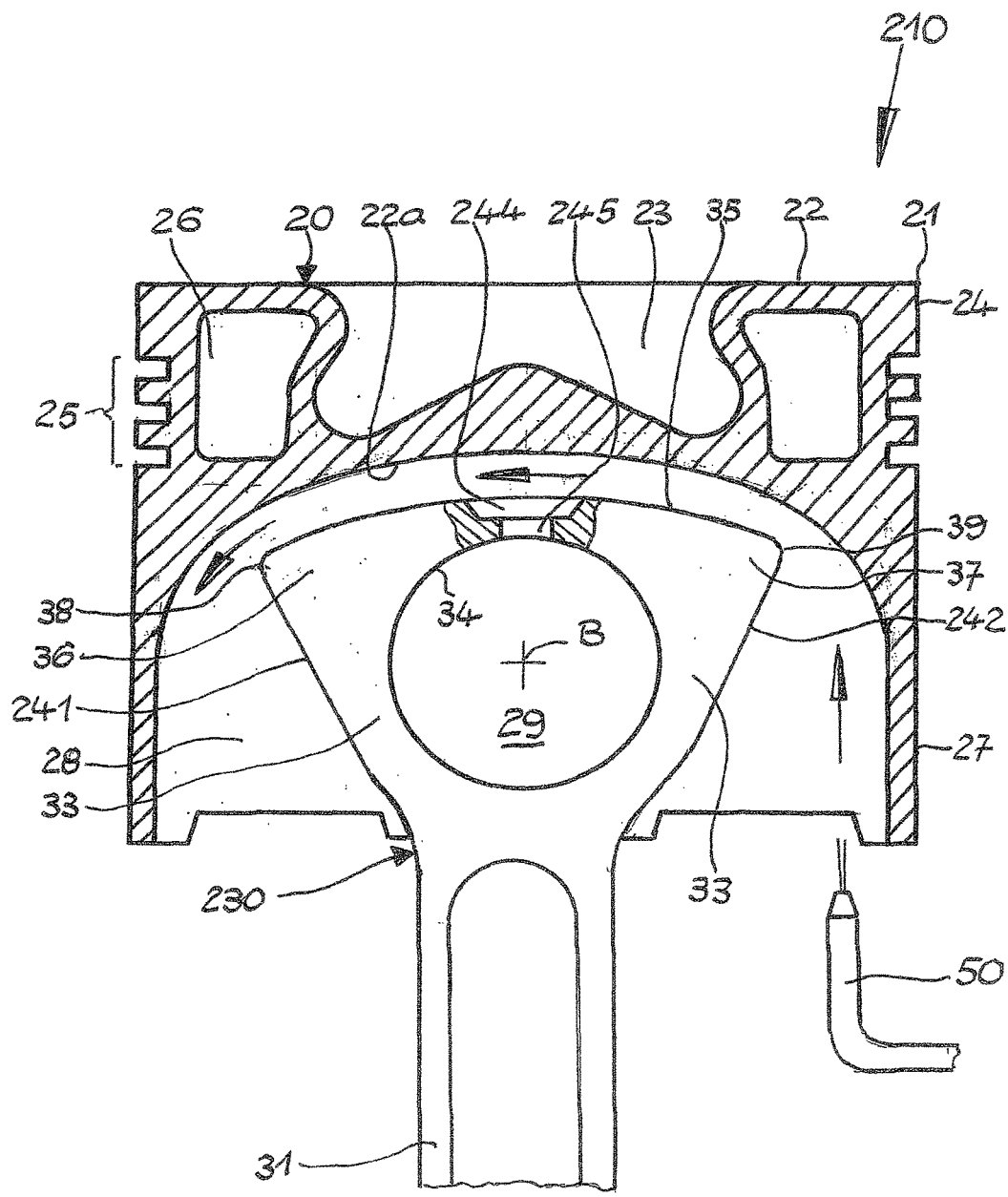
FIG. 3 shows a further exemplary embodiment of an assembly according to the invention comprising a piston and a connecting rod according to the invention in section.

FIG. 3 shows a further exemplary embodiment of an assembly 210 according to the invention, wherein with the exemplary embodiment according to FIG. 1 identical structures are provided with the same reference numbers and in this regard reference is made to the description of FIG. 1. The key difference from the exemplary embodiment according to FIG. 1 lies in the fact that connecting rod 230 has on its end side 35 a tub-shaped recess 244 which serves to collect cooling oil which as a result is prevented from flowing out over a certain period of time so that the cooling action in this region is amplified. There is provided within tub-shaped recess 244 a bore 245 through which cooling oil is conducted into pin bore 34 where it serves as lubricant. Connecting rod 230 furthermore has no concave curvatures, as represented in FIG. 1. Flat surfaces 241 and 242 are provided instead.

FIGS. 5 and 6 show a further exemplary embodiment of a connecting rod 330 which forms with a piston 20 an assembly 10, 110, 210 in accordance with FIGS. 1 to 3. A recess 346 running transverse to central axis B of pin bore 34 is provided on end face 35 of small connecting rod eye 33. Recess 346 is arranged asymmetrically to central axis B of pin bore 34 in the exemplary embodiment. In this case, recess 346 is expediently oriented towards that side of small connecting rod eye 34 which is arranged in the corresponding assembly comprising a piston 20 and connecting rod 330 facing away from injection nozzle 50. Recess 346 furthermore extends over entire overhang 36 which is assigned in the corresponding assembly facing away from injection nozzle 50. As a result, it is achieved that the pivoting movement of connecting rod 31 which executes said movement during engine operation about central axis B of pin bore 34 supports the transport of cooling oil in the direction of overhang 38, i.e. towards the side of small connecting rod eye 33 facing away from injection nozzle 50. Recess 346 has, in the exemplary embodiment, an opening 347 for the transport of cooling oil to pin bore 34. As a result, the lubrication between piston pin 29 and small connecting rod eye 33 is additionally improved in the corresponding assembly.

The invention claimed is:

1. A connecting rod for an internal combustion engine, comprising:
    a connecting rod shank;
    a large connecting rod eye; and
    a small connecting rod eye with a pin bore;
    wherein an end face of the small connecting rod eye has at least one overhang running parallel to a central axis of the pin bore over an entire width of the pin bore transverse to the central axis of the pin bore;
    wherein an edge of the at least one overhang runs parallel to the central axis of the pin bore; and
    wherein the end face of the small connecting rod eye has a recess running transverse to the central axis of the pin bore and arranged one of symmetrically and asymmetrically to the central axis of the pin bore.

2. The connecting rod as claimed in claim 1, wherein the at least one overhang includes two opposite overhangs running parallel to the central axis of the pin bore, the edges of the overhangs running parallel to the central axis of the pin bore.

3. The connecting rod as claimed in claim 1, wherein the small connecting rod eye has at least one concave curvature running directly below an edge parallel to the central axis of the pin bore over the entire width of the pin bore.

4. The connecting rod as claimed in claim 3, wherein the small connecting rod eye has two concave curvatures running on both sides directly below the edges parallel to the central axis of the pin bore over entire width of the pin bore.

5. The connecting rod as claimed in claim 1, wherein the end face of the small connecting rod eye has at least one of a bore and a tub-shaped recess.

6. The connecting rod as claimed in claim 5, wherein the bore is formed within the recess.

7. The connecting rod as claimed in claim 1, wherein the recess has an opening for the supply of cooling oil to the pin bore.

8. An assembly for an internal combustion chamber, comprising:
    a piston including a piston shaft with hub bores;
    a connecting rod including a connecting rod shank, a large connecting rod eye and a small connecting rod eye with a pin bore; and
    an injection nozzle;
    wherein the small connecting rod eye is mounted by a piston bolt accommodated in the hub bores and the pin bore in a piston interior of the piston; and
    wherein an end face of the small connecting rod eye has at least one overhang running parallel to a central axis of the pin bore at least on its side facing the injection nozzle over an entire width of the pin bore transverse to the central axis of the pin bore; and
    wherein an edge of the at least one overhang runs parallel to the central axis of the pin bore.

9. The assembly as claimed in claim 8, wherein the at least one overhang includes two opposite overhangs running parallel to the central axis of the pin bore, the edges of the overhangs running parallel to the central axis of the pin bore.

10. The assembly as claimed in claim 8, wherein the small connecting rod eye has a concave curvature running directly below an edge parallel to the central axis of the pin bore over the entire width of the pin bore at least on a side which is assigned to the injection nozzle.

11. The assembly as claimed in claim 8, wherein the end face of the small connecting rod eye has at least one of a bore and a tub-shaped recess.

12. The assembly as claimed in claim 8, wherein the end face of the small connecting rod eye has a recess running transverse to the central axis of the pin bore, arranged one of symmetrically to the central axis and asymmetrically on a side of the small connecting rod eye which faces away from the injection nozzle.

13. The assembly as claimed in claim 8, wherein the piston has a piston base with a contoured underside and the end face of the small connecting rod eye with the at least one overhang has a contour adapted to the contour of the underside of the piston base.

14. The assembly as claimed in claim 8, wherein the distance between an underside of a piston crown of the piston and the edge facing away from the injection nozzle is smaller than the distance between the underside of the piston crown and the edge facing the injection nozzle.

15. A connecting rod for an internal combustion engine, comprising:
    a connecting rod shank;
    a large connecting rod eye; and
    a small connecting rod eye with a pin bore;
    wherein an end face of the small connecting rod eye has two opposite overhangs running parallel to a central axis of the pin bore over its entire width transverse to the central axis of the pin bore;
    wherein an edge of the overhangs runs parallel to the central axis of the pin bore;
    wherein the small connecting rod eye has at least one concave curvature running directly below an edge parallel to the central axis of the pin bore over an entire width of the piston bore; and
    wherein one of:
        the end face of the small connecting rod eye has a tub-shaped recess and a bore formed within the tub-shaped recess; and
        the end face of the small connecting rod eye has a recess running transverse to the central axis of the pin bore and arranged one of symmetrically and asymmetrically to the central axis of the pin bore.

16. The connecting rod as claim in claim 15, wherein the small connecting rod eye has two concave curvatures running on both sides directly below the edges parallel to the central axis of the pin bore over the entire width of the pin bore.

* * * * *